United States Patent [19]

Kane et al.

[11] 4,309,177

[45] Jan. 5, 1982

[54] METHOD AND SOLUTION FOR THE ROOM TEMPERATURE DYEING OF NYLON

[75] Inventors: James W. Kane, Kent; Richard J. La Conte, Auburn, both of Wash.

[73] Assignee: The Boeing Company, Seattle, Wash.

[21] Appl. No.: 108,444

[22] Filed: Dec. 31, 1979

[51] Int. Cl.$^3$ .......................... D06P 1/39; D06P 1/653
[52] U.S. Cl. .......................................... 8/516; 8/598
[58] Field of Search .................................... 8/598, 516

[56] References Cited

U.S. PATENT DOCUMENTS

| | | | |
|---|---|---|---|
| 3,334,960 | 8/1967 | Abel | 8/598 |
| 3,472,607 | 10/1969 | Sapers | 8/929 |
| 3,706,698 | 12/1972 | Buehler et al. | 8/576 |
| 3,953,168 | 4/1976 | Fabbri et al. | 8/598 |

FOREIGN PATENT DOCUMENTS

| | | | |
|---|---|---|---|
| 5090782 | 7/1975 | Japan | 8/599 |
| 5090781 | 7/1975 | Japan | 8/599 |

*Primary Examiner*—Maria Parrish Tungol
*Attorney, Agent, or Firm*—Laurence A. Savage; B. A. Donahue

[57] ABSTRACT

A method for color dyeing nylon articles and the like utilizing a room temperature dye solution comprises mixing a dyestuff with formic acid to form a dye solution such that the final solution contains 30-60% formic acid in an aqueous solution by volume, applying said dye solution to the area of the nylon article to be colored, and after the dye solution has remained on said article for a predetermined length of time, rinsing the article.

9 Claims, No Drawings

METHOD AND SOLUTION FOR THE ROOM TEMPERATURE DYEING OF NYLON

BACKGROUND OF THE INVENTION

1. Field of the Invention

This invention relates to the dyeing of nylon articles and the like and particularly to dyeing the nylon with a room temperature dye solution.

2. Description of the Prior Art

The methods of dyeing nylon known in the prior art require that the dye solution into which the nylon is immersed be heated to a temperature far in excess of room temperature. The process known in the art is very slow, requires a heated tank, causes dimensional changes in the articles dyed and is not suitable for dyeing thermal formed parts. Furthermore, it is extremely difficult to dye only a portion of the article, for example, the edge of a nylon bushing, or local area coloring on a nylon article, such as lettering, arrows, symbols, etc., because of the high temperature to which the solution must be raised and because of the length of time for which the nylon part must remain in the heated solution.

Our invention overcomes these problems and allows the dyeing of nylon articles with a room temperature solution and nylon articles may be dyed very quickly by utilizing our method—within 15 seconds to 3 minutes depending on the particular article.

SUMMARY OF THE INVENTION

It is the object of this invention to provide a method for color dyeing nylon articles and the like utilizing a room temperature dye solution and which accomplishes the dyeing in a very short time. In accordance with the present invention, the above object and others are provided by a method for color dyeing nylon articles and the like utilizing room temperature dye solution which comprises the steps of mixing a dyestuff with formic acid to form a dye solution such that the final solution contains 30-60% formic acid in an aqueous solution by volume; applying the dye solution to the area of the nylon article to be colored; and rinsing the article with water after the dye solution has remained on the article for a predetermined length of time.

In further accord with the present invention, the method of color dyeing nylon preferably utilizes a final dye solution which contains 55-59% formic acid in an aqueous solution by volume.

This method of dyeing nylon articles has several significant advantages over those known in the art. It allows dyeing of nylon without using high temperature baths and allows local areas of a nylon part to be colored. Furthermore, it allows thermal formed parts to by dyed, and since a heated bath is not utilized, the method of dyeing described herein causes no dimensional changes to the nylon article. The method also allows the dyeing process to be accomplished very rapidly in comparison with those techniques known in the art.

Other objects, features, and advantages of the present invention will become more apparent in the light of the following detailed description of the preferred embodiment thereof.

DESCRIPTION OF THE PREFERRED EMBODIMENT

The common method of dyeing nylon is to boil the nylon part in a RIT (registered trademark) or TINTEX (registered trademark) liquid fabric dye solution. This process is time consuming, requires a heated vat of dye solution, causes dimensional changes in parts fabricated from nylon, makes dyeing of local areas on parts virtually impossible, and is not suitable for thermoformed parts. It is also known to utilize CAPRACYL (registered trademark), MERPACYL (registered trademark), and acetate dyes. However, the processes known for dyeing with them also require a heated bath for cleaning and dyeing, in some cases the processes are time consuming, and they are not suitable for dyeing only a localized area on a nylon part.

As illustrated in the following examples our invention solves the above-enumerated problems and allows the dyeing of nylon parts and localized areas thereof at room temperature in a relatively small amount of time.

EXAMPLE 1

A nylon disc one inch in diameter and approximately 1/16-inch thick was cleaned and then immersed in a room temperature dye solution comprising one part RIT liquid yellow fabric dye and two parts 88 percent formic acid. Brilliant color resulted after a one-minute immersion. The disc was then rinsed in water and air dried at room temperature.

EXAMPLE 2

A nylon disc one inch in diameter and approximately 1/6-inch thick was cleaned. A triangular area was them marked off on the face of the disc. A dye solution comprising one part blue RIT liquid dye and two parts 90 percent formic acid was made and the dye solution was applied locally to the triangular area. The dye solution was allowed to remain on the disc for two minutes after which the disc was rinsed in water, the washing removed, and the disc dried in air at room temperature. The triangular area had excellent color density.

EXAMPLE 3

A nylon article, similar to those described in Examples 1 and 2 was cleaned and immersed in a room temperature dye solution comprising 1 gram of MERPACYL red dye in powder form (one of the so-called "acid" dyes), 32 cubic centimeters of 88 percent formic acid, and 16 cubic centimeters of water. Immersion of the nylon article for one minute in this dye solution resulted in excellent coloring of the nylon. The advantages of the acid dyes over the liquid fabric dyes are more precise control of color proportions and elimination of residue which is sometimes formed when using the liquid fabric dyes.

It should be noted that a dye color may be used as is or it may be blended with other colors to obtain the desired final color. We have also found that repeated immersions of a nylon article in the dye solution will increase the brilliance of color in the finished nylon article, and that to color a nylon article with a dark color, such as black or dark brown, it is desirable to immerse the article in the dye solution for two or three minutes.

There has thus been described a preferred embodiment of a method of dyeing nylon articles in a room temperature dye solution in accordance with our invention. It should be understood by those skilled in the art that various changes in the form and detail thereof may be made therein without departing from the spirit and scope of the invention which is to be limited only as set forth in the following claims.

What we claim as new and desire to secure by Letter Patent of the United States is:

1. An improved method for color dyeing nylon articles and the like utilizing a room temperature dye solution, comprising the steps of:

applying an aqueous dye solution consisting essentially of an acid dye and 30%-60% formic acid by volume to the area of the nylon article to be colored whereby acceptable color density is achieved in one to three minutes, and without a fixing step, rinsing said article with water.

2. An improved method of color dyeing nylon articles and the like as defined in claim 1 wherein the applying step utilizes a dye solution consisting essentially of an acid dye and 55-59% formic acid in an aqueous solution by volume.

3. An improved method for color dyeing nylon articles and the like as defined in claim 1 or 2 comprising the additional step of cleaning the nylon article prior to the step of applying the dye solution to the article.

4. An improved method of color dyeing nylon articles and the like as defined in claim 1, wherein the dyestuff comprises a powder acid dye.

5. An improved method of color dyeing nylon articles and the like as defined in claim 1, wherein the dyestuff comprises a liquid acid dye.

6. An aqueous dye solution consisting essentially of on a weight basis:
   2.7 percent acid dye, and
   97.3 percent 40-60% formic acid in an aqueous solution by volume.

7. An aqueous dye solution consisting essentially of dye and formic acid in the proportion:
   1 gram powder acid dye to
   48 cubic centimeters of 30-60% formic acid by volume.

8. An aqueous dye solution consisting essentially of dye and formic acid in the proportion:
   1 gram powder acid dye to
   48 cubic centimeters of 55-59% formic acid by volume.

9. An aqueous dye solution consisting essentially of dye and formic acid in the proportion by volume:
   1 part liquid acid dye to
   2 parts 88-90% formic acid by volume.

* * * * *